United States Patent [19]
Roberts et al.

[11] 3,878,402
[45] Apr. 15, 1975

[54] APPARATUS FOR DETECTING RAPID VARIATIONS IN AN OUTPUT QUANTITY

[75] Inventors: Thomas Ernest Edwin Roberts, Birmingham; John Norman Barnard, Solihull, both of England

[73] Assignee: Lucas Aerospace Limited, Birmingham, England

[22] Filed: Mar. 12, 1973

[21] Appl. No.: 340,234

[30] Foreign Application Priority Data
Mar. 16, 1972 United Kingdom............... 12307/72

[52] U.S. Cl................. 307/235; 307/233; 307/321
[51] Int. Cl......................... H03k 5/20; H03k 17/74
[58] Field of Search..................... 307/321, 233, 235

[56] References Cited
UNITED STATES PATENTS
3,278,830 10/1966 Rupp .............................. 307/321 X
3,286,031 11/1966 Geddes ......................... 307/321 X
3,287,572 11/1966 Robson .......................... 307/321 X Primary Examiner—John S. Heyman
Attorney, Agent, or Firm—Hill, Gross, Simpson, Van Santen, Steadman, Chiara & Simpson

[57] ABSTRACT

An apparatus for detecting a rapid variation in an input quantity, such as the compressor delivery pressure of a gas turbine engine has a generating arrangement which provides an alternating signal whose magnitude is dependent on the value of the input quantity. The generating arrangement includes an automatic gain control and associated delay device so that the alternating signal has a substantially constant value except when there is a significant reduction in the input quantity in less than the delay time of the delay device. There is an associated detector circuit which provides an output pulse of predetermined duration in response to such a reduction in the input quantity.

6 Claims, 4 Drawing Figures

APPARATUS FOR DETECTING RAPID VARIATIONS IN AN OUTPUT QUANTITY

This invention relates to an apparatus for detecting a rapid variation in an input quantity and in particular to such an apparatus when used to detect a rapid reduction in the delivery pressure of the compressor of a gas turbine engine.

An apparatus according to the invention comprises means for generating an alternating signal having a frequency which is substantially constant and having an amplitude dependent on the magnitude of the input quantity, first and second similar diodes, to a respective anode and cathode of which the said alternating signal is, in use, applied, a resistance chain between the cathode of the first diode and the anode of the second diode, a pair of disimilar capacitors connected in series across the resistance chain and having their common point connected to a reference voltage and means for deriving an output from a selected point on the resistance chain, the arrangement being such that the discharge time of either capacitor is much greater than the length of a half cycle of the said alternating signal.

Examples of an apparatus according to the invention will now be described with reference to the accompanying drawings, in which.

Figure 1:
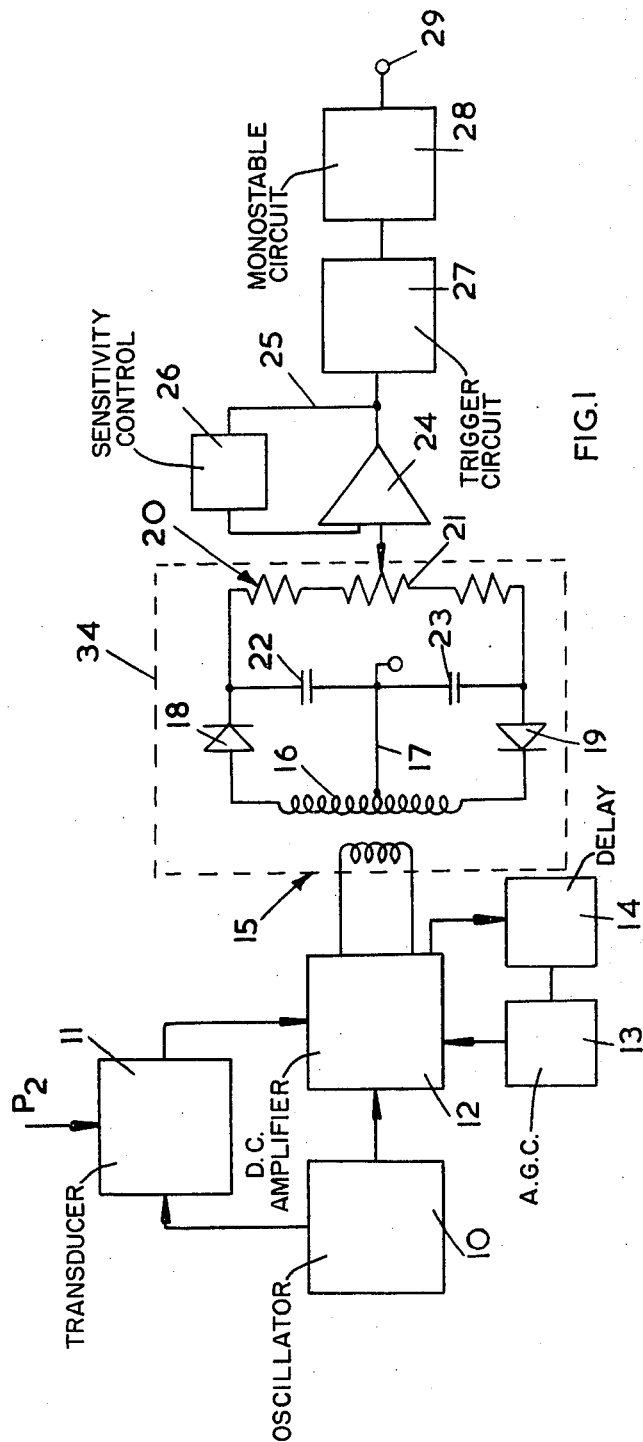
FIG. 1 is a block diagram of the apparatus.

An oscillator 10 generates a signal of substantially constant voltage and frequency and supplies an inductive pressure transducer and its associated balancing circuit, shown generally at 11. The oscillator 10 also supplies one input of an a.c. amplifier 12, the other input of which is formed by the output of the transducer circuit 11. The output of the amplifier 12 is regulated by an automatic gain control 13 such that the output of the amplifier 12 is substantially a maximum for all values of the input signal from transducer circuit 11 which are 10 percent or more of the maximum value of the said input signal. The automatic gain control 13 is, however, itself controlled by a delay device 14, so that a reduction in the input signal causes a corresponding change in the output of the amplifier 12 only until the gain control operates to restore the output.

The output of the amplifier 12 is supplied to a transformer 15 having a secondary winding 16 with a centre tap 17. The ends of the winding 16 are respectively connected to a pair of similar diodes 18, 19. The cathode diode 18 is connected to the anode of diode 19 via a resistance chain 20 which includes a potentiometer 21. A pair of disimilar capacitors 22, 23 are respectively connected between the diodes 18, 19 and the centre tap 17. Capacitor 23 conveniently has a capacity of one hundred times that of the capacitor 22. The centre tap 17 is connected to a reference voltage.

The transformer 15, diodes 18, 19, capacitors 22, 23 and the resistance chain 20 combine to form a detector circuit 34.

The moving point of the potentiometer 21 is connected to the input of a d.c. amplifier 24 having a feedback loop 25. The loop 25 includes a sensitivity control means 26 for the amplifier 24. The sensitivity control 26 may include a tuned filter, in order to raise the gain of the amplifier 24 at a given frequency. The output of the amplifier 24 forms the input of a trigger circuit 27 whose output is fed to a monostable circuit 28 to produce at point 29 a pulse of a predetermined width and amplitude. The output level from amplifier 24 is dependent on the variation in the output of amplifier 12, and thus on the rate of change of the input signal $P_2$.

In use an input quantity acts upon the transducer circuit 11, and in the example considered this quantity is the delivery pressure $P_2$ of the compressor of a gas turbine engine. The signal from the oscillator 10 is varied in amplitude by the transducer circuit 11 in accorance with the value of $P_2$, and is supplied to the amplifier 12. Due to the action of gain control 13 the output of the amplifier 12 remains substantially constant at its maximum value, except when a significant drop in the value of $P_2$ occurs in substantially less time than the delay imposed by device 14.

The alternating voltage induced in the secondary winding 16 is peak-rectified by the diodes 18, 19, the voltage at diode 18 being positive, and that at diode 19 negative, with respect to the centre tap 17. The capacitors 22, 23 are charged to the peak voltages occurring across them. A voltage drop occurs in the resistance chain 20 and the moving point of the potentiometer 21 is adjusted so that the voltage thereat is equal to the reference voltage at the centre tap 17 when the output of the amplifier 12 is constant.

If $P_2$ falls rapidly there is a transient fall in the output of the amplifier 12 and hence in the voltages at the diodes 18, 19. The duration of this transient fall will be substantially equal to that of the delay of the automatic gain control 13, and is very much greater than the frequency interval of the oscillator 10. The capacitors 22, 23 therefore discharge through the resistor chain 20. The decay of charge in the capacitor 23 is less rapid than that in capacitor 22 and the input to the amplifier 24 becomes negative for a time depending on the difference in values of the capacitors 22, 23. The input of the amplifier 24 returns to zero when the capacitors 22, 23 have discharged to the reduced voltage across diodes 18, 19, or when the output of the amplifier 12 again rises to a maximum. A negative going input to the d.c. amplifier 24 results in a corresponding input to the trigger circuit 27. If the output from the amplifier 24 exceeds the triggering level of trigger circuit 27, the latter has an output which is a shaped pulse having a sharp edge which causes the monostable circuit to produce the output pulse at point 29.

Figure 2:
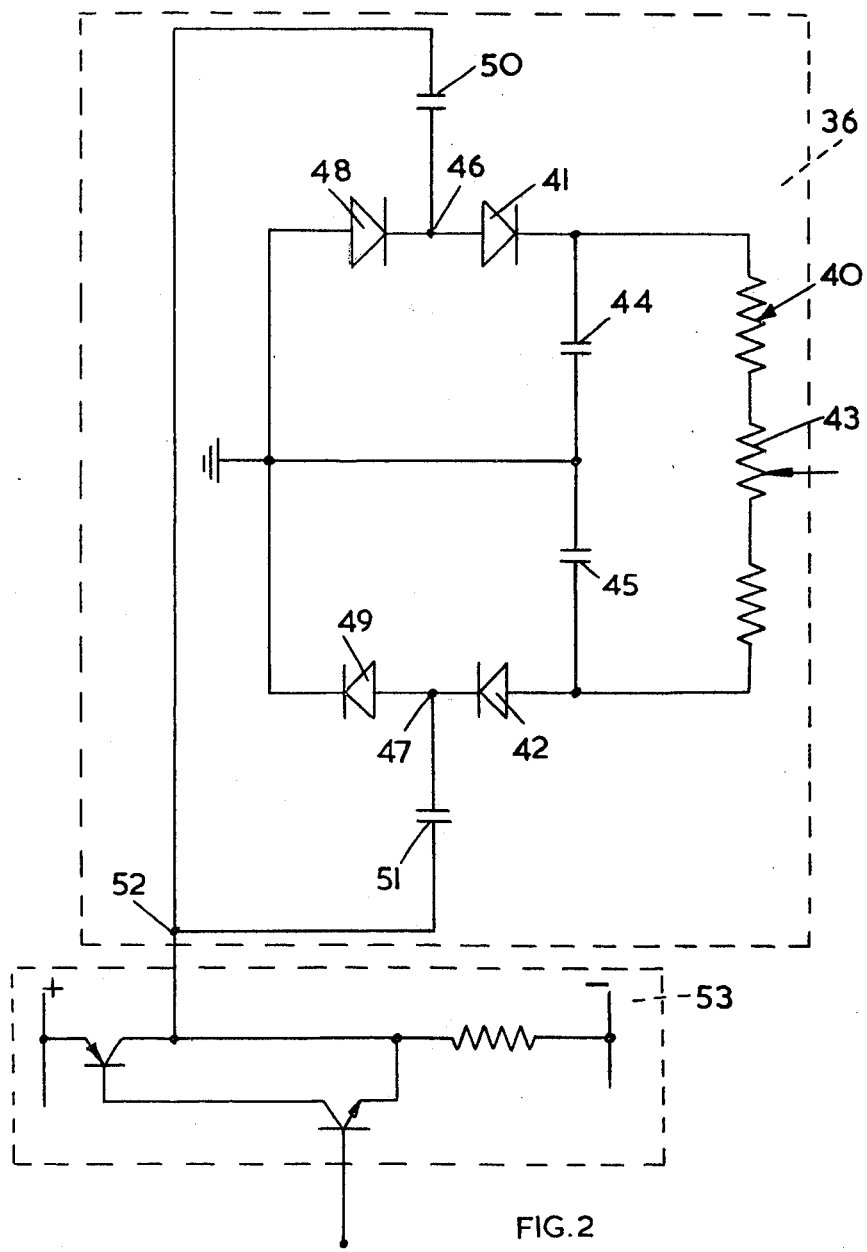
FIG. 2 shows an alternative form of part of the apparatus.

In the alternative form of the detector circuit 36 shown in FIG. 2 a resistance chain 40 is connected between the respective cathode and anode of a pair of similar diodes 41, 42. The resistance chain 40 includes a potentiometer 43. Connected in series across the ends of the resistance chain 40 are a pair of capacitors 44, 45, the value of capacitor 45 being one hundred times that of capacitor 44.

The common point of capacitors 44, 45 is connected to earth. Points 46, 47 at the respective anode and cathode of diodes 41, 42 are respectively connected to one side of each pair of similar capacitors 50, 51. The other sides of capacitors 50, 51 are connected to a point 52, which is in turn connected via a buffer circuit 53 to the output of amplifier 12. A Further pair of similar diodes 48, 49 is connected as shown between the points 46, 47 and the common point of the capacitors 44, 45. During a positive half cycle of the signal from the amplifier 12 current flows in diode 41, capacitor 44 is charged positively, and point 47 is at earth potential. During the negative half cycle current flows in diode 42, capacitor 45 is charged negatively and point 46 is at earth potential.

The discharge times of capacitors 44, 45 are much greater than the length of each half cycle of the signal at points 46, 47. The capacitors 44, 45 thus remain charged at substantially the respective peak levels of the signal at points 46, 47 so long as the said signal remains constant. The moving point of the potentiometer 43 is adjusted to the point on the resistance chain 40 where the voltage is zero. A fall in the level of the signal at points 46, 47 results in a negative-going pulse at the potentiometer moving point. This pulse is amplified and forms the input to a trigger circuit and monostable circuit in a similar manner to that previously described.

The onset of stall or surge in the compressor of a gas turbine engine is accompanied by a rapid drop in compressor delivery pressure. The output pulse from the monostable circuit 27 may be used to, provide indication of such a drop or to initiate and maintain corrective action.

Figure 3:
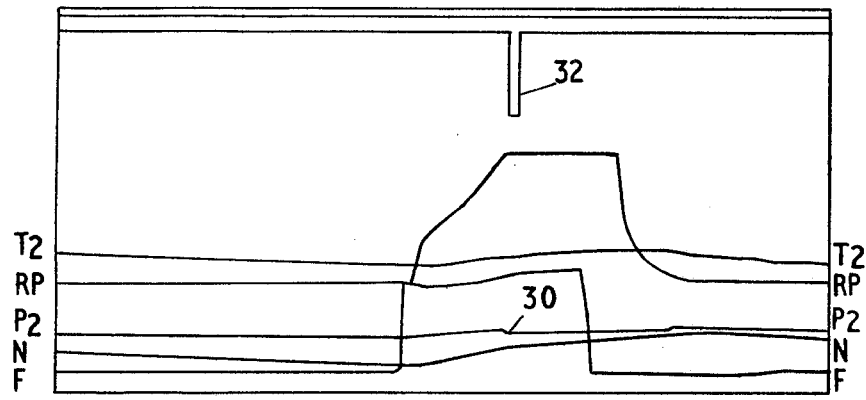
FIGS. 3 and 4 show graphically the response of the apparatus to variations in the delivery pressure of a gas turbine engine compressor.
Figure 4:
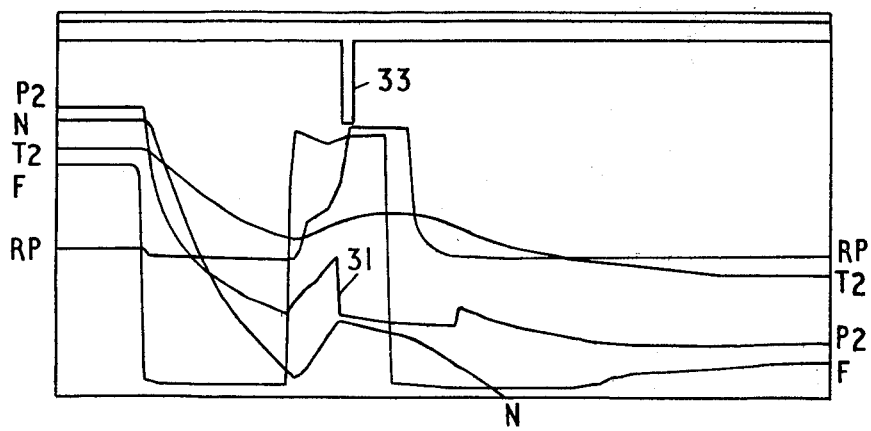

FIGS. 3 and 4 show recordings of the response of the apparatus to variations in $P_2$ for a variety of engine operating conditions, amongst which:

F is the rate of fuel flow,

N is the engine speed, $T_2$ is the temperature at the compressor delivery, and

RP is the voltage output from the radiation probe which senses engine jet pipe temperature.

In each case a compressor stall was induced by rapidly increasing the rate of fuel flow from a low value. The resultant decreases in $P_2$ are shown at 30 and 31 and the corresponding output pulses from the apparatus at 32 and 33. Pulses 32, 33 are shown as negative going but can conveniently be made positive going. It will be seen that pulses 32, 33 are initiated by a sharp drop in $P_2$ and have substantially identical magnitude and duration, irrespective of the magnitude of the drop in $P_2$.

We claim:

1. An apparatus for detecting a rapid variation in an input quantity, comprising means for generating an alternating signal having a frequency which is substantially constant and having an amplitude dependent on the magnitude of the input quantity, first and second similar diodes, said alternating signal being applied to a respective anode and cathode of said first and second diodes, a resistance chain between the cathode of the first diode and the anode of the second diode, a pair of dissimilar capacitors connected in series across the resistance chain and having their common point connected to a reference voltage and means for deriving an output from a selected point on the resistance chain, the arrangement being such that the discharge time of either capacitor is much greater than the length of a half cycle of the said alternating signal, said alternating signal generating means including a transducer device responsive to said input quantity to provide a first electrical signal and an amplifier responsive to said first electrical signal, said amplifier having an automatic gain control device so that said alternating signal has a maximum value when said first electrical signal exceeds a predetermined level, and a delay circuit to which said gain control device is responsive, the arrangement being such that said gain control device operates to maintain said alternating signal substantially at said maximum value except when a fall in said first electrical signal is such as to cause a substantial reduction in said alternating signal from said maximum value in a time less than the delay imposed by said delay circuit.

2. An apparatus as claimed in claim 1 in which said alternating signal generating means includes an oscillator having an output signal of substantially constant voltage and frequency, said transducer device and said amplifier being responsive to said output signal.

3. An apparatus as claimed in claim 1 which includes a pair of similar capacitors connected to the anode and cathode respectively of said similar diodes, said similar capacitors having a common point to which said alternating signal is, in use, applied, a further pair of similar diodes, the respective cathode and anode of which are connected to the anode and cathode respectively of the first mentioned similar diodes, and the respective anode and cathode of the further diodes being connected to the common point of the dissimilar capacitors.

4. An apparatus as claimed in claim 3 in which the means for deriving an output from the resistance chain comprises a potentiometer forming part of said resistance chain and a d.c. amplifier responsive to the voltage at said point.

5. An apparatus as claimed in claim 4 which includes a trigger circuit responsive to an output signal from said d.c. amplifier.

6. An apparatus as claimed in claim 5 which includes a monostable circuit responsive to a signal from said trigger circuit to provide an output signal for the apparatus as a whole.

* * * * *